(12) United States Patent
Lee

(10) Patent No.: US 9,639,449 B2
(45) Date of Patent: May 2, 2017

(54) ERROR DETECTION DEVICE FOR PROGRAMMING LANGUAGE

(71) Applicant: LSIS CO., LTD., Anyang-si, Gyeonggi-do (KR)

(72) Inventor: Sang Hun Lee, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 707 days.

(21) Appl. No.: 13/970,480

(22) Filed: Aug. 19, 2013

(65) Prior Publication Data

US 2014/0058540 A1 Feb. 27, 2014

(30) Foreign Application Priority Data

Aug. 23, 2012 (KR) .................. 10-2012-0092136

(51) Int. Cl.
*G06F 21/00* (2013.01)
*H04L 29/06* (2006.01)
(Continued)

(52) U.S. Cl.
CPC .......... *G06F 11/3604* (2013.01); *G06F 11/36* (2013.01); *G06F 8/71* (2013.01)

(58) Field of Classification Search
CPC ........ G06F 11/36; G06F 11/3604; G06F 8/71; G05B 19/56
See application file for complete search history.

(56) References Cited

U.S. PATENT DOCUMENTS 6,009,268 A * 12/1999 Reis ..................... G05B 19/056
717/139

8,498,982 B1 * 7/2013 Cope ................. G06F 17/30908
707/694
(Continued)

FOREIGN PATENT DOCUMENTS

CN 1926513 3/2007
CN 102591635 7/2012
(Continued)

OTHER PUBLICATIONS

Qi Zhang, Yan Wu, Zhuoye Ding, Xuanjing Huang; "Learning hash codes for efficient content reuse detection"; SIGIR '12: Proceedings of the 35th international ACM SIGIR conference on Research and development in information retrieval; Publisher: ACM; Aug. 2012; pp. 405-414.*

(Continued)

*Primary Examiner* — Shewaye Gelagay
*Assistant Examiner* — Courtney Fields
(74) *Attorney, Agent, or Firm* — Lee, Hong, Degerman, Kang & Waimey

(57) ABSTRACT

An error detection device and method for a programming language is provided, the device including a program preparation unit configured to prepare a program by using a programming language, a logic converter configured to convert the prepared program to a sequence, a hash code calculator configured to detect a same logic relative to a sequence by dividing the converted sequence to a minimum unit of a plurality of program languages, calculating each hash code by the divided minimum unit of the plurality of program languages and comparing each calculated hash code, and an LCS (Longest Common Subsequence) calculator calculating an LCS relative to the sequence divided by the minimum unit of the plurality of program languages, and detecting a similar logic relative to the sequence by applying the calculated LCS to an LCS algorithm.

6 Claims, 3 Drawing Sheets

(51) Int. Cl.
*G06F 11/36* (2006.01)
*G06F 13/00* (2006.01)
*G06F 11/08* (2006.01)
*H04N 5/00* (2011.01)
*H04N 7/24* (2011.01)
*G06F 9/44* (2006.01)

(56) References Cited

U.S. PATENT DOCUMENTS

2010/0306514 A1    12/2010  Frost
2012/0304148 A1*  11/2012  Braun ...................... G06F 8/71
                                                      717/104
2014/0123104 A1*   5/2014  Frohberger .......... G05B 19/056
                                                      717/106

FOREIGN PATENT DOCUMENTS

EP             2455855         5/2012
JP          2010-067188     3/2010
KR      20130054570 A *  5/2013  ............. G06F 21/56

OTHER PUBLICATIONS

The State Intellectual Property Office of the People's Republic of China Application Serial No. 201310373735.4, Office Action dated Oct. 19, 2015, 9 pages.

European Patent Office Application Serial No. 13181328.9, Search Report dated Dec. 5, 2013, 7 pages.

* cited by examiner

ERROR DETECTION DEVICE FOR PROGRAMMING LANGUAGE

CROSS-REFERENCE TO RELATED APPLICATION

Pursuant to 35 U.S.C. §119(a), this application claims the benefit of earlier filing date and right of priority to Korean Application Number 10-2012-0092136, filed on Aug. 23, 2012, the contents of which are hereby incorporated by reference in their entirety.

BACKGROUND OF THE INVENTION

Field of the Invention

Aspects of the present disclosure relate to an error detection device for programming language and method thereof, and more particularly to an error detection device for IEC61131-3 programming language and a method thereof.

Description of Related Art

In general, a user is prone to err in controlling a PLC (Programmable Logic Controller) due to diversified and distributed PLC programming language, and squandering of manpower and material resources resultant from use of each PLC programming language is often generated. In order to solve these problems, IEC (International Electrotechnical Commission) has adopted a language internationally standardized as IEC61131-3, and integrated and standardized the conventional PLC programming languages.

FIG. 1 is a block diagram of a program environment of a PLC automation system according to prior art.

Referring to FIG. 1, a program of a PLC automation system includes a program preparation unit (11) configured to prepare a program by providing an IEC 61131-3 programming environment, a program download unit (12) downloading the prepared program to a controller, and a program verification unit (13) verifying the downloaded program.

The program controller of the automation system frequently controls the PLC automation program by repeatedly using one or more same logics or similar logics. However, there is a problem of searching and changing the same or similar logics one by one during logic change, in a case same or similar logics are repeatedly used, due to lack of elements such as template for repeated logic use during preparation of programs, in comparison between the IEC 61131-3 programming language used in the PLC automation system and C/C++ language which is a higher level programming language.

Particularly, logic change for use of one or more same components must be equally applied to all cases where same components are used. Even if one component is omitted from logic change, reliability deteriorates to an entire automation system. Although same or similar logics alike must be importantly managed from a development stage of automation system to trial operation and maintenance/repair stages, functions of searching for same or similar logics are not provided under the conventional program environment of automation system.

SUMMARY OF THE INVENTION

Exemplary aspects of the present disclosure are to substantially solve at least the above problems and/or disadvantages and to provide at least the advantages as mentioned below. Thus, the present disclosure is directed to provide an error detection device for a programming language configured to report same (identical) or similar logics on a program of an automation system by detecting the same or similar logics, and a method thereof.

The present disclosure is also directed to provide an error detection device for a programming language configured to rapidly and easily detect logic same as (identical to) or similar to an erroneous logic, and to allow a user to pre-recognize an error-prone logic, and a method thereof.

In one general aspect of the present disclosure, there is provided an error detection device for a programming language on a PLC automation system, the device comprising:

a program preparation unit configured to prepare a program by using a programming language;

a logic converter configured to convert the prepared program to a sequence;

a hash code calculator configured to detect a same logic relative to a sequence by dividing the converted sequence to a minimum unit of a plurality of program languages, calculating each hash code by the divided minimum unit of the plurality of program languages and comparing each calculated hash code; and an LCS (Longest Common Subsequence) calculator calculating an LCS relative to the sequence divided by the minimum unit of the plurality of program languages, and detecting a similar logic relative to the sequence by applying the calculated LCS to an LCS algorithm.

Preferably, but not necessarily, the error detection device may further comprise a result determinator configured to determine that a relevant sequence is a same logic, in a case hash codes are mutually same by comparing the hash codes for each minimum unit of the plurality of program languages calculated by the hash code calculator, and to determine that a relevant sequence is a similar logic, in a case the LCS is greater than a similarity threshold of a set sequence by comparing the LCS calculated by the LCS calculator with the similarity threshold of the set sequence.

Preferably, but not necessarily, the error detection device may further comprise a logic reporting unit configured to report same logic detection, similar logic detection and determination results relative to the sequence.

Preferably, but not necessarily, the error detection device may further comprise a threshold input unit configured to change and set, by a user, a similarity threshold of the sequence, in a case the similar logic is not detected, or the number of similar logics exceeds a set threshold.

Preferably, but not necessarily, the error detection device may further comprise a variable filtering unit configured to remove information on variables of the programming language for accurate detection and determination of same logic.

In another general aspect of the present disclosure, there is provided an error detection method for a programming language on a PLC automation system, the method comprising:

preparing a program using a programming language and converting the prepared program to a sequence;

detecting a same logic relative to a sequence by dividing the converted sequence to a minimum unit of a plurality of program languages, calculating each hash code by the divided minimum unit of the plurality of program languages and comparing each calculated hash code; and calculating an LCS (Longest Common Subsequence) relative to the sequence divided by the minimum unit of the plurality of program languages, and detecting a similar logic relative to the sequence by applying the calculated LCS to an LCS algorithm.

Preferably, but not necessarily, the method may further comprise determining that a relevant sequence is a same logic, in a case hash codes are mutually same by comparing the hash codes for each minimum unit of the plurality of program languages calculated by the hash code calculator, and to determine that a relevant sequence is a similar logic, in a case the LCS is greater than a similarity threshold of a set sequence by comparing the LCS calculated by the LCS calculator with the similarity threshold of the set sequence.

Preferably, but not necessarily, the method may further comprise reporting to a user same logic detection, similar logic detection relative to the sequence and determination results thereof Preferably, but not necessarily, the method may further comprise changing and setting, by a user, a similarity threshold of the sequence, in a case the similar logic is not detected, or the number of similar logics exceeds a set threshold.

Preferably, but not necessarily, the method may further comprise removing information on variables of the programming language for accurate detection and determination of same logic.

The exemplary embodiment of the present disclosure is advantageous in that a potential logic error that may be generated in a trial operation and maintenance/repair stages of automation system can be prevented by recognizing, by a user, same or similar logics used by automation system program to improve reliability of the automation system.

DETAILED DESCRIPTION

Figure 1:
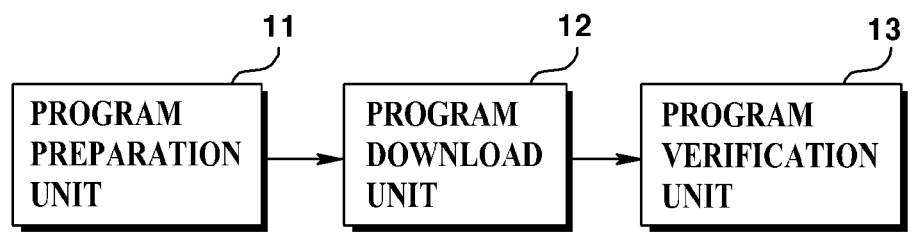
FIG. 1 is a block diagram illustrating a program environment of a PLC automation system according to prior art.

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Although the following detailed description explained and illustrated IEC61131-3 language as a programming language, the present disclosure is not limited thereto, and it should be apparent to the skilled in the art that other languages than the IEC61131-3 language may be applied to the present disclosure.

Error detection device and method for programming language according to exemplary embodiments will be described more fully hereinafter with reference to the accompanying drawings, where like reference numerals refer to like elements throughout.

Figure 2:
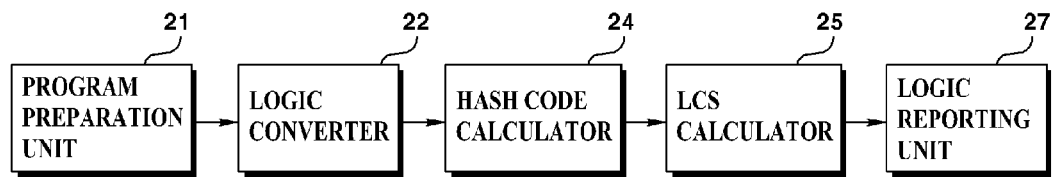
FIG. 2 is a block diagram illustrating an error detection device for a programming language according to a first exemplary embodiment of the present disclosure.

FIG. 2 is a block diagram illustrating an error detection device for a programming language according to a first exemplary embodiment of the present disclosure.

Referring to FIG. 2, the error detection device for a programming language according to the present disclosure may include a program preparation unit (21), a logic converter (22), a hash code calculator (24), an LCS (Longest Common Subsequence) calculator (25) and a logic reporting unit (27).

First, a user programs a program using IEC61131-3 language through the program preparation unit (21). The IEC61131-3 language uses graphic type language, and the logic converter (22) converts the IEC61131-3 program language programmed by a user through the program preparation unit (21) to a sequence format.

The hash code calculator (24) divides the IEC61131-3 program language converted to the sequence format by the logic converter (22) for each minimum unit (rung) of IEC61131-3 program language. The hash code calculator (24) detects same logics by comparing each hash code after calculating a hash code of each divided rung.

The LCS calculator (25) detects similar logics using LCS algorithm for determining similarity of each rung after calculating LCS (Longest Common Subsequence) for each minimum unit (rung) of the IEC61131-3 program language, where the LCS algorithm is to output a longest one out of common subsequences, the detailed explanation of which will be omitted herein as it would be obvious to the skilled in the art.

The logic reporting unit (27) reports to a user a result of searched same or similar logics by using the hash code and LCS. That is, the logic reporting unit (27) reports logics having same hash code as same logics, and reports as similar logics the logics having greater similarity threshold than that preset by a user. The similarity threshold of sequence preset by the user will be described in detail with reference to FIG. 5.

Figure 3:
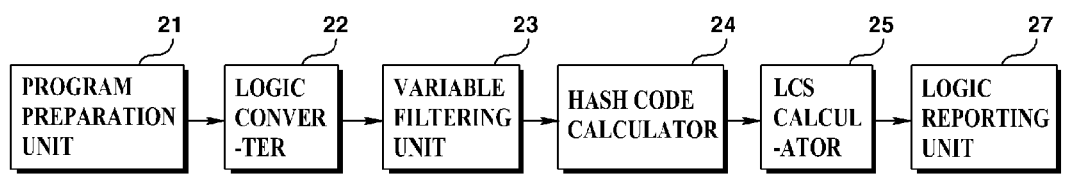
FIG. 3 is a block diagram illustrating an error detection device for a programming language according to a second exemplary embodiment of the present disclosure.

FIG. 3 is a block diagram illustrating an error detection device for a programming language according to a second exemplary embodiment of the present disclosure, where FIG. 3 further includes a variable filtering unit (23) in addition to what is illustrated in FIG. 2.

Referring to FIG. 3, the error detection device for a programming language according to the present disclosure may include a program preparation unit (21), a logic converter (22), a variable filtering unit (23), a hash code calculator (24), an LCS (Longest Common Subsequence) calculator (25) and a logic reporting unit (27).

First, a user programs a program using IEC61131-3 language through the program preparation unit (21). The IEC61131-3 language uses graphic type language, and the logic converter (22) converts the IEC61131-3 program language programmed by a user through the program preparation unit (21) to a sequence format.

The variable filtering unit (23) removes variable information used by the program in response to selection of a user, where the user may select to minimize influence on variables by the variable filtering unit (23), whereby similarity among rungs can be prevented from being lowered by difference of variables inputted by the user. That is, in a case the variable filtering unit (23) is used, a similar user program can be detected regardless of variable information inputted by the user, and a process of minimizing the influence on variables by the variable filtering unit (23) will be described later with reference to FIG. 4.

The hash code calculator (24) divides the IEC61131-3 program language converted to the sequence format by the logic converter (22) for each minimum unit (rung) of IEC61131-3 program language. The hash code calculator (24) detects same logics by comparing each hash code after calculating a hash code of each divided rung.

The LCS calculator (25) detects similar logics using LCS algorithm for determining similarity of each rung after calculating LCS for each minimum unit (rung) of the IEC61131-3 program language.

The logic reporting unit (27) reports to a user a result of searched same or similar logics by using the hash code and LCS. That is, the logic reporting unit (27) reports logics having same hash code as same logics, and reports as similar logics the logics having greater similarity threshold than that preset by a user.

Figure 4:
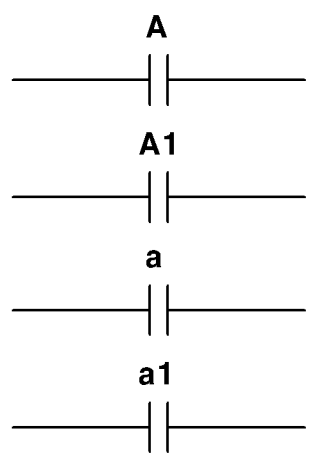
FIG. 4 is a schematic view illustrating an operation of filtering a variable of a programming language by a variable filtering unit illustrated in FIG. 3.

FIG. 4 is a schematic view illustrating an operation of filtering a variable of a programming language by a variable filtering unit illustrated in FIG. 3.

Referring to FIG. 4, same capacitors (condensers) are illustrated in graphic format, and the same capacitors are expressed as A, A1, a, and a1 respectively. That is, the same capacitors are expressed in four different variables.

In a case four same capacitors and respective variables are converted to characters, capacitors may be converted to same characters, but variables are respectively converted to different characters, and logics that may be detected as same logics may develop a problem of being detected as similar logics. Thus, the same logics can be accurately searched as the variable filtering unit (23) removes the variable information.

Figure 5:
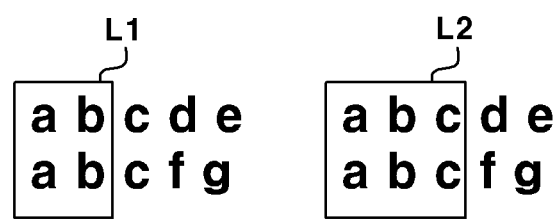
FIG. 5 is a schematic view illustrating an example of setting, by a user, a similarity threshold of a sequence in an error detection device for a programming language according to the present disclosure.

FIG. 5 is a schematic view illustrating an example of setting, by a user, a similarity threshold of a sequence in an error detection device for a programming language according to the present disclosure.

Referring to FIG. 5, assuming that sequences comparing the similarity are 'abcde' and 'abcfg' respectively, for example, it is possible to set a case (L1) as being similar where 'ab' forming each sequence are same and remaining characters are different, or to set a case (L2) as being similar where 'abc' are same, and remaining characters are different. That is, it is possible for a user, for similarity threshold of sequences, to set as a threshold a case where two characters out of the sequences thus compared are same, or a case where three characters are same.

If similar logics desired by the user are not detected or too many similar logics are detected even by the similarity threshold of sequences set up by the user, the user may change the similarity threshold of sequences to search similar logics desired by the user. The set-up of similarity threshold of sequences is not limited thereto, and it should be apparent that methods of threshold being different may be also set up.

Figure 6:
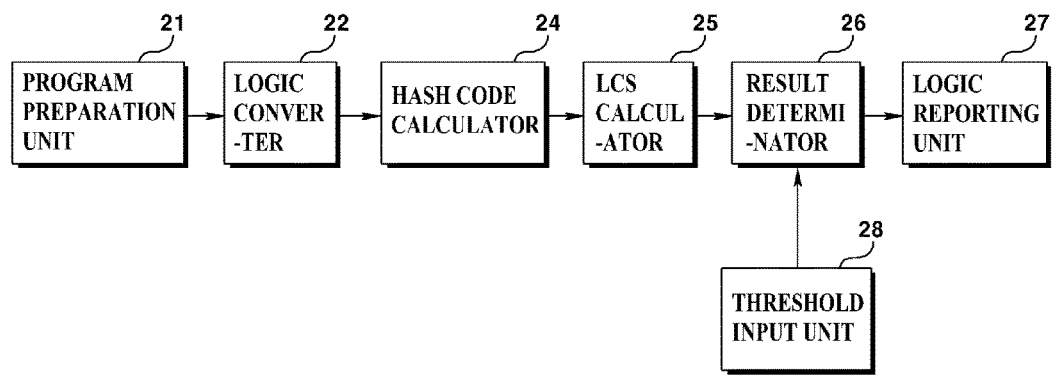
FIG. 6 is a block diagram illustrating an error detection device for a programming language according to a third exemplary embodiment of the present disclosure.

FIG. 6 is a block diagram illustrating an error detection device for a programming language according to a third exemplary embodiment of the present disclosure.

Referring to FIG. 6, the error detection device for a programming language according to the present disclosure may include a program preparation unit (21), a logic converter (22), a hash code calculator (24), an LCS calculator (25), a result determinator (26), a logic reporting unit (27) and a threshold input unit (28).

First, a user programs a program using IEC61131-3 language through the program preparation unit (21). The IEC61131-3 language uses graphic type language, and the logic converter (22) converts the IEC61131-3 program language programmed by a user through the program preparation unit (21) to a sequence format.

The hash code calculator (24) divides the IEC61131-3 program language converted to the sequence format by the logic converter (22) for each minimum unit (rung) of IEC61131-3 program language, and calculates hash code of each divided rung.

The LCS calculator (25) divides the IEC61131-3 program language converted to the sequence format by the logic converter (22) for each minimum unit (rung) of IEC61131-3 program language, and calculates LCS for each divided unit The result determinator (26) determines the same logics by comparing the hash codes of each rung, and determines the similar logics by comparing similarity threshold of sequences set up by the LCS of each rung and the threshold input unit (28). That is, logics having same hash code are determined as same logics, and logics having greater similarity threshold than that preset by the user through the threshold input unit (28) are determined as similar logics.

The logic reporting unit (27) reports to a user a result of searched same or similar logics by the result determinator (26).

However, if similar logics are not detected or too many similar logics are detected, the user may change the similarity threshold of sequences using the threshold input unit (28). The result determinator (26) detects the similar logics for each unit (rung) of IEC61131-3 program language, using the similarity threshold of changed sequences and the LCS algorithm. If similar logics are detected, the logic reporting unit (27) reports the detected similar logics to the user.

If similar logics are not detected or too many similar logics are detected, the user may change again the similarity threshold of sequences using the threshold input unit (28). That is, change of similarity threshold of sequences may be repeated by the user to thereby detect similar logics desired by the user.

Figure 7:
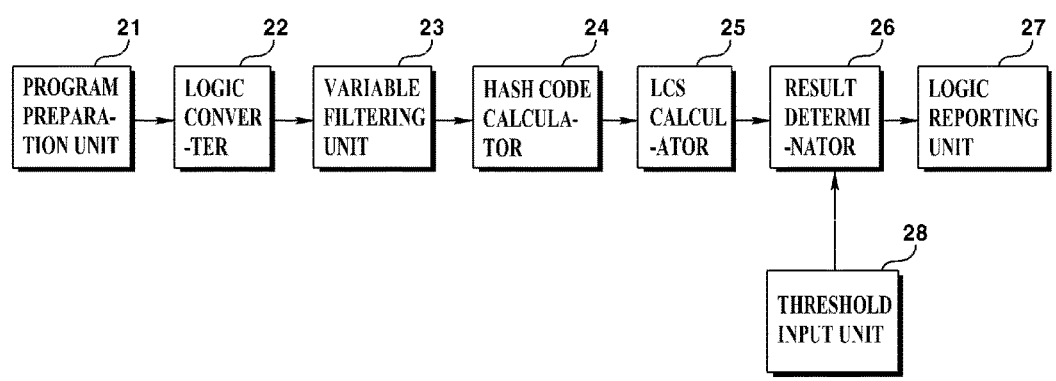
FIG. 7 is a block diagram illustrating an error detection device for a programming language according to a fourth exemplary embodiment of the present disclosure.

FIG. 7 is a block diagram illustrating an error detection device for a programming language according to a fourth exemplary embodiment of the present disclosure, where FIG. 7 further includes the variable filtering unit (23) unlike FIG. 6.

Referring to FIG. 7, the error detection device for a programming language according to the present disclosure may include a program preparation unit (21), a logic converter (22), a variable filtering unit (23), a hash code calculator (24), an LCS (Longest Common Subsequence) calculator (25), a result determinator (26), a logic reporting unit (27) and a threshold input unit (28).

First, a user programs a program using IEC61131-3 language through the program preparation unit (21). The IEC61131-3 language uses graphic type language, and the logic converter (22) converts the IEC61131-3 program language programmed by a user through the program preparation unit (21) to a sequence format.

The variable filtering unit (23) removes variable information used by the program in response to selection of a user, and whereby similarity among rungs can be prevented from being lowered by difference of variables inputted by the user. Furthermore, the variable filtering unit (23) is configured such that influence on variables can be minimized by a user selection, whereby similar user programs can be detected without being influenced by the variable information inputted by the user.

The hash code calculator (24) divides the IEC61131-3 program language converted to the sequence format by the logic converter (22) for each minimum unit (rung) of IEC61131-3 program language, and calculates the hash code of each divided rung.

The LCS calculator (25) divides the IEC61131-3 program language converted to the sequence format by the logic converter (22) for each minimum unit (rung) of IEC61131-3 program language, and calculates LCS for each unit.

The result determinator (26) determines the same logics by comparing the hash codes of each rung, and determines the similar logics by comparing similarity threshold of sequences set up by the LCS of each rung and the threshold input unit (28). That is, logics having same hash code are determined as same logics, and logics having greater similarity threshold than that preset by the user through the threshold input unit (28) are determined as similar logics.

The logic reporting unit (27) reports to a user a result of searched same or similar logics by the result determinator (26).

However, if similar logics are not detected or too many similar logics are detected, the user may change the similarity threshold of sequences using the threshold input unit (28). The result determinator (26) detects the similar logics for each unit (rung) of IEC61131-3 program language, using the similarity threshold of changed sequences and the LCS algorithm. If similar logics are detected, the logic reporting unit (27) reports the detected similar logics to the user.

If similar logics are not detected or too many similar logics are detected, the user may change again the similarity threshold of sequences using the threshold input unit (28). That is, change of similarity threshold of sequences may be repeated by the user to thereby detect similar logics desired by the user.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An error detection device for a programming language on a PLC (Programmable Logic Controller) automation system, the device comprising:
    a program preparation unit configured to prepare a program by using the programming language;
    a logic converter configured to convert the prepared program to a sequence;
    a variable filtering unit configured to remove information related to variables of the programming language in response to a user selection by removing variable information used by the program;
    a hash code calculator configured to detect same logic relative to the sequence by dividing the sequence into a minimum unit of a plurality of program languages, calculating hash codes according to the divided minimum unit and comparing each of the calculated hash codes;
    an LCS (Longest Common Subsequence) calculator configured to calculate an LCS relative to the divided sequence and detect similar logic relative to the sequence by applying the calculated LCS to an LCS algorithm; and
    a threshold input unit configured to set a similarity threshold of the sequence according to a user input and change the similarity threshold when either similar logic is not detected or an amount of detected similar logic exceeds the set similarity threshold,
    wherein the programming language comprises IEC61131-3 programming language of which a minimum unit is rung.

2. The error detection device according to claim 1, further comprising a result determinator configured to:
    determine that a relevant sequence is same logic when each calculated hash code for each minimum unit is same; and
    determine that a relevant sequence is similar logic when the calculated LCS is greater than the set similarity threshold.

3. The error detection device according to claim 2, further comprising a logic reporting unit configured to report same logic detection, similar logic detection and determination results relative to the sequence.

4. An error detection method for a programming language on a PLC (Programmable Logic Controller) automation system, the method comprising:
    preparing a program using the programming language;
    converting the prepared program to a sequence;
    removing information related to variables of the programming language in response to a user selection by removing variable information used by the program;
    detecting same logic relative to the sequence by dividing the sequence into a minimum unit of a plurality of program languages;
    calculating hash codes according to the divided minimum unit;
    comparing each of the calculated hash codes;
    calculating an LCS (Longest Common Subsequence) relative to the divided sequence;
    detecting similar logic relative to the sequence by applying the calculated LCS to an LCS algorithm; and
    setting a similarity threshold of the sequence according to a user input and changing the similarity threshold when either similar logic is not detected or an amount of detected similar logic exceeds the set similarity threshold,
    wherein the programming language comprises IEC61131-3 programming language of which a minimum unit is rung.

5. The error detection method of claim 4, further comprising:
    determining that a relevant sequence is same logic when each calculated hash code for each minimum unit is same; and
    determining that a relevant sequence is similar logic when the calculated LCS is greater than the set similarity threshold.

6. The error detection method of claim 5, further comprising reporting same logic detection, similar logic detection and determination results relative to the sequence.

* * * * *